UNITED STATES PATENT OFFICE.

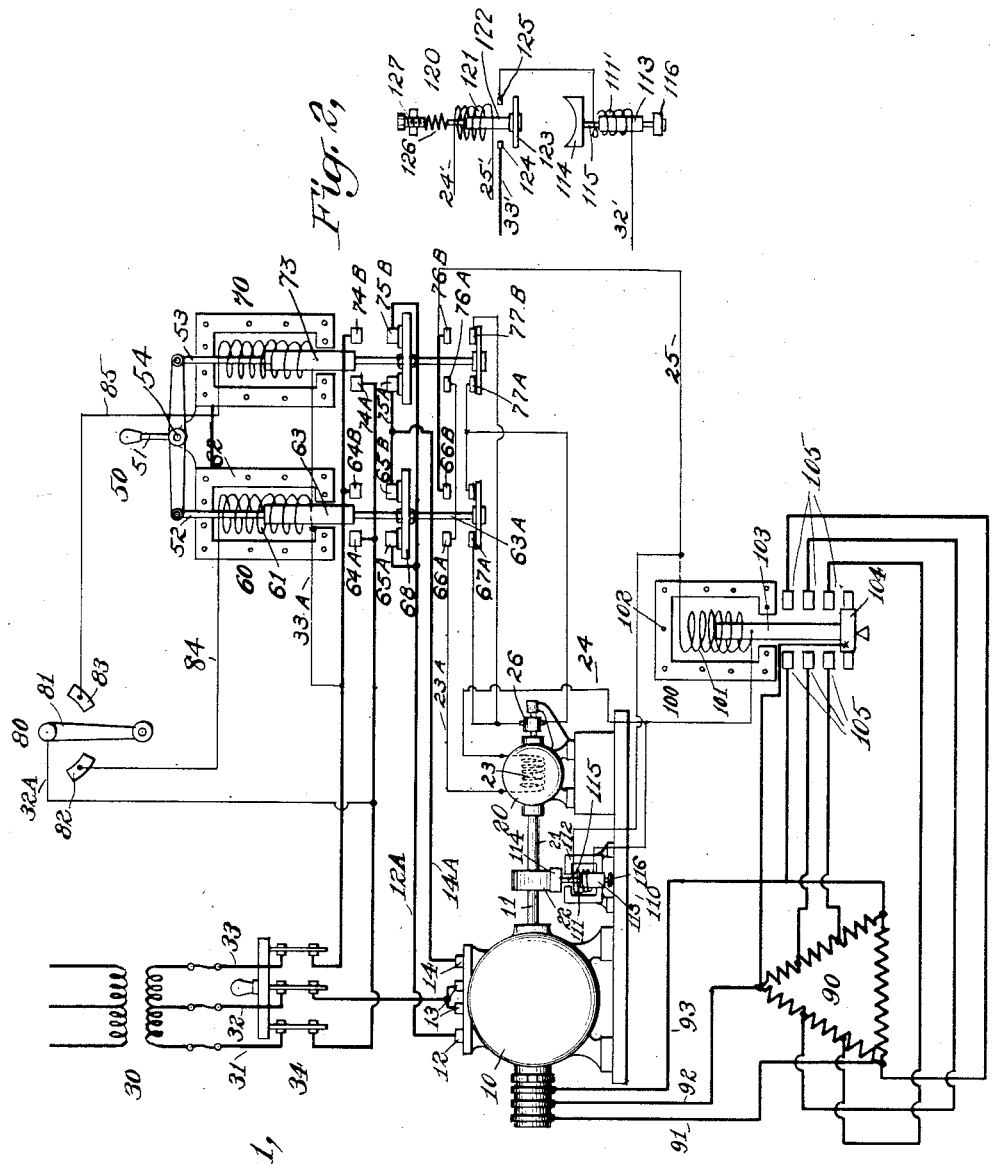

AXEL MAGNUSON, OF NEW YORK, N. Y., ASSIGNOR TO OTIS ELEVATOR COMPANY, OF JERSEY CITY, NEW JERSEY, A CORPORATION OF NEW JERSEY.

SYSTEM OF MOTOR CONTROL.

No. 830,242.  Specification of Letters Patent.  Patented Sept. 4, 1906.

Application filed September 20, 1905. Serial No. 279,367.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, and otherwise controlled at will.

Although my system is applicable to other types of electric motors, it may be used to great advantage in conjunction with such motors as are operated by alternating currents.

I have made application for Letters Patent, Serial No. 241,592, filed January 18, 1905, for a system of motor control which embodies the broad idea of the present invention, and the present invention is of certain improvements and developments of the invention disclosed in said prior application.

Referring to the drawings, Figure 1 shows in side elevation an electric motor and certain other apparatus which I use in carrying out my invention, together with a diagrammatic representation of their connecting electrical circuits. Fig. 2 shows a modification of one part of my invention.

Like characters of reference designate corresponding parts in both of the figures.

10 designates an electric motor which is to be controlled. It is shown as a multiphase alternating-current motor; but it may be of any other desired type. 20 designates a direct-current generator of the series-wound type. It is connected to run with the motor and to be driven thereby. It may be directly connected to the motor by having its shaft 21 connected to the motor-shaft 11 by a coupling 22, as shown, or it may be connected in any other suitable manner.

30 designates a transformer. Its primary may be connected to a suitable source of electrical supply. Its secondary may be connected by the mains 31, 32, and 33 through a manually-operated main-line switch 34 to the various parts of the apparatus, as will be shown latter.

50 designates a circuit-closer for the motor-circuits which may be operated mechanically or electrically and which constitutes a starting-switch or a reversing-switch for the motor.

80 is a manually-operated switch which may be situated at any convenient place and by means of which an operator may control the movements of the motor at will. This switch comprises a pivoted contact-arm 81, which is connected by a conductor $32^A$ to main-line conductor 31, and which may be moved over to the left or right to make contact with either one of two stationary contact-plates 82 or 83. When it is moved over to the left onto contact-plate 82, a circuit is completed thereby from main-line conductor 31, through conductor $32^A$, pivoted arm 81, stationary contact 82, conductor 84, winding 61 of magnet 60, and conductor $33^A$, to main 33. The magnet-winding 61 will therefore be connected across mains 31 and 33, and magnet 60 will be energized thereby. This magnet comprises a frame 62, which is preferably constructed of laminated magnetic material, and a core 63 of similar material. When it is energized, it will lift this core and certain connected parts which I will now point out.

Directly below magnet 60 are certain stationary contacts, two of which are designated by $64^A$ and $64^B$. Two movable contacts $65^A$ and $65^B$ are mounted upon, but insulated from, a cross-bar 68, which is connected to core 63 by a rod $63^A$. When core 63 is raised, these movable contacts $65^A$ $65^B$ are brought up against the stationary contacts $64^A$ $64^B$, respectively, and thereby close certain motor-circuits. By inspecting the diagram it may be seen that main-line conductor 31 is connected to stationary contact $64^A$ and that main-line conductor 33 is connected to stationary contact $64^B$. It may also be seen that motor-terminal 12 is connected to movable contact $65^A$ by conductor $12^A$ and that motor-terminal 14 is connected to movable contact $65^B$ by conductor $14^A$, while the main-line conductor 32 is directly connected to the central motor-terminals 13. Now when magnet 60 has been energized and has closed its contacts, it is evident that the mains 31, 32, and 33 will then be connected to motor-terminals 12, 13, and 14, respectively. The motor will then begin to rotate in one direction. When the operator brings the pivoted contact-lever 81 of switch 80 back to its central position, this will break the circuit through magnet-winding 61, and magnet 60 will be deënergized and will allow its core to drop. This will open the motor-circuit and cause the latter to come to rest.

If the operator had moved pivoted contact-lever 81 to the right, the result would have been similar; but in this case magnet 70 would have been energized and would have closed contacts 75$^A$ and 75$^B$ against 74$^A$ and 74$^B$. This would have connected mains 31 and 33 to motor-terminals 14 and 12, respectively, and as main 32 is connected directly to the central terminals 13 the motor will receive current from the line in the opposite direction from that before described and will begin to rotate in the opposite direction.

I sometimes arrange to operate the reversing-switch 50 by hand, and for this purpose the three-armed lever 51 may be provided. This is pivoted at 54, and the ends of its horizontal position may be connected, as shown, by rods 52 and 53 to magnet-cores 63 and 73 and through the latter to the movable contacts below the magnets.

The operation of this device is obvious. When the vertical portion of lever 51 is moved to the right, the contacts under magnet 60 will be closed. When it is moved to the left, the switch under magnet 70 will be closed and when it is brought back to central position all this switch will be opened. Thus the motor may be started by manual means in either direction or it may be stopped at will.

An opposition element 90 may be included in the motor-circuit to prevent its too-rapid acceleration. I have shown such an element at 90 in the form of a delta-connected resistance. This is shown connected in the rotor of motor 10 by conductors 91, 92, and 93. It is desirable to gradually cut this resistance out of the rotor-circuit automatically as the motor accelerates, and it is also desirable that this should be done in proportion to the acceleration of the motor, which will vary with different loads.

I will now briefly describe an arrangement which I have invented for accomplishing the above results.

20 is a direct-current generator, which, as has been stated, is connected to run with the motor. Therefore its speed, and consequently its generated voltage, will be proportional to the speed of the motor. This may have a series field 23, one side of which is connected to stationary contacts and of the reversing-switch 50 by conductor 23$^A$, and the other side of which may lead to other devices by conductor 24. Two other stationary contacts of the reversing-switch are connected together and to certain other apparatus by conductor 25. The armature 26 may be connected to the movable contacts, as shown, in such a manner as to reverse the connections on the reversing-switch between the armature 26 and the series field 23. This will cause the generated current to pass always in one direction through series fields 23 and the mains 24 and 25. The magnetic fields of generator 20 will therefore be energized quickly and a current will be generated quickly.

The generated current will be approximately proportional in strength to the speed of the motor, and it is this variable strength of generated current which I utilize to automatically control the acceleration of the motor and to perform certain other functions.

100 designates an electroresponsive device which comprises a solenoid-coil 101 within a magnet-frame 102, arranged when energized to lift a core 103, to which is attached a sliding contact 104. The frame and core are preferably constructed of laminated magnetic material. Sliding contact 104 is arranged to be gradually drawn up over a series of stationary contacts 105. These may be connected to the resistance 90, as shown, and so arranged that as sliding contact 104 is drawn over stationary contacts 105 it short-circuits resistance 90 in a number of steps.

Solenoid-coil 101 may be directly connected to the leads or mains 24 and 25 from generator 20, as shown, so that its energization and consequently the action of the core 103 and contact 104 will be proportional to the voltage of generator 20. I sometimes connect a dash-pot with core 103 to further regulate its movement. This may be done in a well-known manner, which needs no further description here.

110 designates an electrically-actuated brake, which may be arranged to act upon some moving part of the motor or its connected mechanism—as, for example, upon the coupling 22. It comprises a winding 111 within a magnet-frame 112 and a magnetic core 113, which is connected to a brake-shoe 114 by a rod 115. This is merely a diagrammatic construction for the purpose of illustrating my invention; but in practice many other forms of construction may be used, if desired. The winding 111 may be connected directly to the mains or leads 24 25 from the generator 20, as shown. It will then be energized by a variable current which will increase in strength as the speed of the motor 10 increases. When the magnet is sufficiently energized, it will exert an upward pull upon core 113 and will apply the brake shoe 114 to the coupling or brake-pulley 22. The effect of this brake will of course increase as the speed of the motor increases. It is desirable to adjust its action so that it will not be applied until the motor's speed begins to get too great. This may be done in any desired manner, as by means of a spring or by adding weight 116 to the core.

Fig. 2 illustrates a modification of this part of my invention. In this case a relay 120 is provided. Its coil or solenoid-winding 121 may be connected to the generator-mains 24 and 25 by conductors 24' 25'. A core 122 is placed within this coil and is arranged to be drawn up by the latter when it is sufficiently energized and to raise a contact-plate 123 up against two stationary contacts 124 and 125. The brake-magnet coil 111' may be in this case arranged to be connected across two of the mains from the outside source of supply. For example, conductors 32' and 33' may be connected to main-line conductors 32 and 33 at any convenient place. Conductor 32' is connected to one side of winding 111', the other side of which is connected to stationary contact 125, while conductor 33' is connected to stationary contact 124. When contact-plate 123 is raised up against contacts 124 and 125, a circuit will be completed thereby through brake-winding 111' and the brake will be applied. In either case this brake may be arranged to retard the motor to its normal speed, or it may be arranged to have a greater effect, even to the extent of stopping the motor, if desired.

Above relay-core 122 I have shown a spring 126, with an adjusting-screw 127. These may be provided, if desired, to adjust the action of relay 120 and cause it to act at any desired speed of motor 10.

I have shown this invention as applied to an alternating-current motor; but it is not necessarily limited to this use. The invention is of course applicable to many of the uses to which electric motors may be put and is useful whenever it is desirable to control the movement of the motor either manually or electrically, or from a point near the motor, or from a distance, and also whenever it is desired to provide a simple and efficient means for automatically preventing the motor from attaining a speed in excess of a predetermined degree.

The brake herein described may of course be used in conjunction with other brakes, such as are well known, for stopping the motor after the current-supply has been cut off from it.

What I claim is—

1. The combination with a motor, of an accelerating device therefor, a brake, an electric brake-applying means, a generator connected to said motor, and electric circuits and connections to effect the operation of said accelerating device immediately upon the starting of the motor and to effect the actuation of said brake-applying means upon the motor attaining a predetermined speed.

2. The combination with a motor, of a starting device therefor, a brake, an electromagnet associated with said brake, a generator connected to run with the motor, and circuits and connections controlled by said starting device for effecting the operation of said electromagnet to apply the brake upon the motor attaining a predetermined speed.

3. The combination with a motor, of a starting device therefor, a generator connected to run with the motor, an electromagnetic brake, and means controlled by said starting device for effecting the operation of said brake when the motor reaches a predetermined speed.

4. The combination with a motor, of starting apparatus therefor, a generator to run with the motor, normally open switching mechanism coacting with said starting apparatus, and an electromagnetic brake controlled by said switching mechanism.

5. The combination with a motor, of reversing switches therefor, a generator connected to said motor, a brake for said motor, electromagnetic means for positively applying said brake, and switch apparatus coacting with said reversing-switches and connected between the generator and the electromagnetic means to effect the operation of the brake upon the motor attaining a predetermined speed.

6. The combination with a motor, of reversing-switch apparatus therefor, a brake, an electric device for actuating said brake, a generator with a normally open circuit, and means actuated upon the operation of said reversing-switch apparatus for closing the generator-circuit and electrically connecting the same to said electric device.

7. The combination with a motor, of main-line and reversing-switches for said motor, a generator connected to be driven by said motor, a brake for the motor, an electromagnet connected to said brake, accelerating apparatus for the motor, an electromagnet for operating said accelerating apparatus, a normally open circuit including said generator and said electromagnets, and electric switches connected to said first-named switches for closing the circuit between said generator and the brake and accelerating-magnets.

8. The combination with a motor, of a reversing-switch therefor, a generator connected to be driven by the motor, accelerating apparatus for the motor, an electroresponsive device for operating said accelerating apparatus, a normally open circuit including the generator and said electroresponsive device, a brake, a magnet for actuating said brake, said magnet being connected to said circuit, and means coacting with said reversing-switch for changing the field connections of said generator when the motor is reversed and for closing said normally open circuit when the reversing-switch is operated in either direction.

9. The combination with a motor, of a reversing-switch therefor, a generator connected to be driven by the motor, a brake, an electroresponsive device for operating said brake, a normally open circuit including said generator and electroresponsive device, and means coacting with said reversing-switch for connecting said generator to said electroresponsive device, and for changing the field connections of the generator when the motor is reversed.

10. The combination with an alternating-current motor, of a reversing-switch therefor, a direct-current generator connected to run with the motor, accelerating apparatus for the motor, an electroresponsive device for operating said accelerating apparatus, electromagnetic brake apparatus for the motor, a normally open circuit including said generator and said electroresponsive device and electromagnetic brake apparatus, and auxiliary switches connected to said reversing-switch to effect a reversal of the generator-field connections when the motor is reversed.

11. A motor, a reversing-switch therefor, electrical means for actuating said reversing-switch, a brake, a generator connected to run with the motor, an electroresponsive device for operating said brake, and means for controlling said electroresponsive device to effect the application of the brake upon the motor reaching a predetermined speed.

12. A motor, a reversing-switch therefor, a generator connected to run with the motor, said generator having a series field and being arranged to control the acceleration of the motor, and means combined with the reversing-switch for changing the connections of said series fields upon a reversal of the motor.

13. An alternating-current motor, a reversing-switch therefor, a direct-current generator connected to run with the motor, said generator having an armature and a series field and being arranged to control the acceleration of the motor, and means combined with the reversing-switch for reversing the connections between said armature and series field whenever the reversing-switch is actuated to reverse the motor.

14. An alternating-current motor, a reversing-switch therefor, means for actuating said reversing-switch, a direct-current generator connected to run with the motor, said generator having an armature and a series field and being arranged to control the acceleration of the motor, and means combined with the reversing-switch for reversing the connections between said armature and series field whenever the reversing-switch is actuated to reverse the motor.

15. An alternating-current motor, a reversing-switch therefor, electrical means for actuating said reversing-switch, a direct-current generator connected to run with the motor, said generator having a series field, a brake, a magnet for actuating said brake, means for controlling the acceleration of the motor, a normally open circuit including the brake-magnet, and means combined with the reversing-switch for reversing the connections of said series field whenever the said reversing-switch is actuated to reverse the motor and for closing said normally open circuit.

16. An alternating-current motor, a reversing-switch therefor, electric means for operating said reversing-switch, a master-switch for controlling said electric means, a brake for the motor, an electroresponsive device for operating said brake, and a direct-current generator connected to run with the motor and to supply current to said electroresponsive device to effect the application of the brake when the motor reaches a predetermined speed.

17. An alternating-current motor, a reversing-switch therefor, a brake for the motor, a direct-current generator connected to run with the motor and arranged to actuate the brake, said generator having an armature and a series field and means combined with the reversing-switch for reversing the connections between said armature and series field whenever the reversing-switch is actuated to reverse the motor.

18. An alternating-current motor, a reversing-switch therefor, a brake for the motor, a direct-current generator connected to run with the motor and arranged to actuate the brake and to control the acceleration of the motor, said generator having an armature and a series field, and means combined with the reversing-switch for reversing the connections between said armature and series field whenever the reversing-switch is actuated to reverse the motor.

19. An alternating-current motor, a reversing-switch therefor, a brake for the motor, an opposition element in the motor-circuit, a direct-current generator connected to run with the motor and arranged to actuate the brake and to cut the opposition element out of the motor-circuit, said generator having an armature and a series field, and means on the reversing-switch for reversing the connections between said armature and series field whenever the reversing-switch is actuated to reverse the motor.

20. An alternating-current motor, a reversing-switch therefor, a brake for the motor, an opposition element in the motor-circuit, and a direct-current generator connected to run with the motor, said generator being arranged to generate a current proportional in strength to the speed of the motor, and to actuate the brake and to cut the opposition element out of the motor-circuit as the motor accelerates, said generator having an armature and series field, and means combined with the reversing-switch for reversing the connections between said armature and series field whenever the series field is actuated to reverse the motor.

21. An alternating-current motor, a reversing-switch therefor means for actuati the reversing-switch, a brake for the motor, an opposition element in the motor-circuit, a direct-current generator connected to run with the motor and arranged to generate a voltage proportional in strength to the speed of the motor, means dependent upon said variable voltage for applying the brake to the motor, and electroresponsive device actuated by said variable voltage arranged to cut the opposition element out of the motor-circuit step by step in proportion to the acceleration of the motor; said direct-current generator having an armature and a series field, and means combined with the reversing-switch for reversing the connections between said armature and series field whenever the reversing-switch is actuated to reverse the motor.

In testimony whereof I have signed my name to this specification in the presence of two subscribing witnesses.

AXEL MAGNUSON.

Witnesses:
JOSEPH E. CAVANAUGH,
ERNEST W. MARSHALL.